United States Patent [19]

Wood

[11] 4,154,006
[45] May 15, 1979

[54] CODING AND DECODING MACHINE

[75] Inventor: Chester C. Wood, Washington, D.C.

[73] Assignee: The United States of America as represented by the Secretary of the Navy, Washington, D.C.

[21] Appl. No.: 65,741

[22] Filed: Feb. 25, 1936

[51] Int. Cl.² .............................................. H04L 9/00
[52] U.S. Cl. .......................................... 35/3; 340/350; 340/357
[58] Field of Search .................... 35/2, 3, 4; 340/350, 340/354, 357, 358

[56] References Cited

U.S. PATENT DOCUMENTS

| 1,984,599 | 12/1934 | Safar | 35/6 |
| 2,089,603 | 8/1937 | Hagelin | 35/3 |
| 2,139,676 | 12/1938 | Friedman | 35/4 |

Primary Examiner—Howard A. Birmiel
Attorney, Agent, or Firm—John R. Utermohle

EXEMPLARY CLAIM

3. A coding and decoding machine, comprising a plurality of keys each of which bears a symbol, a plurality of indicating elements each of which represents a symbol on one of said keys, and means to connect each of said keys at random to an indicating element, said means including devices for forming randomly permuting electric circuits between said keys and said indicating elements, operating mechanisms acting at respectively different rates upon different ones of said devices to change said circuits, common driving means for all of said mechanisms, and means for simultaneously disconnecting all of said devices from said devices to permit of setting said devices to desired relative initial positions.

10 Claims, 17 Drawing Figures

INVENTOR
C.C. WOOD

INVENTOR
C.C. WOOD.
BY
ATTORNEY

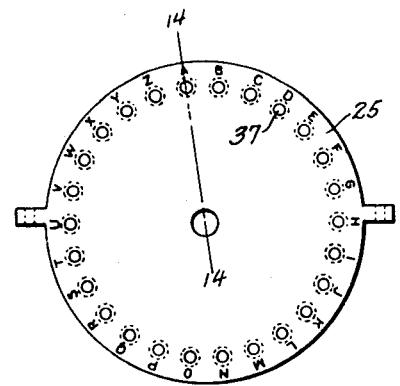
Fig.10.
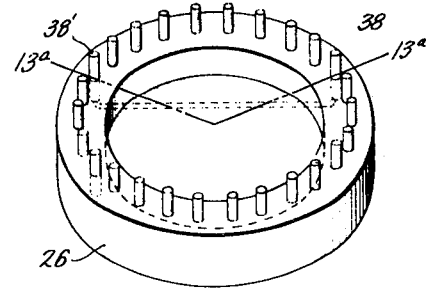
Fig.13.
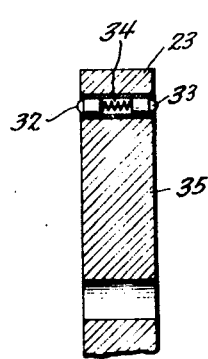
Fig.11.
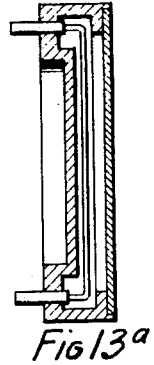
Fig.13ª
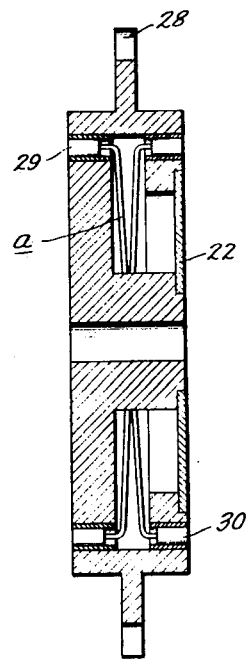
Fig.12
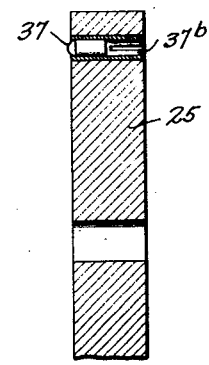
Fig.14.
INVENTOR
C.C. WOOD
BY
Robert A. Lavender
ATTORNEY

CODING AND DECODING MACHINE

The invention described herein may be manufactured and used by or for the Government of the United States of America for governmental purposes without the payment of any fees thereon or therefor.

This invention relates to a machine for enciphering and deciphering code messages and has among its numerous objects: To provide a small, readily portable code machine that will afford a high degree of security through the great number of permutations between the plain language symbols and the code symbols; to provide for facility of setting the elements to any desired initial relation; to provide means for causing variably intermittent operation of certain elements.

The manner in which these and other objects are attained will be fully set forth hereinafter.

In the drawings:

FIG. 10 is a side elevation of the stationary right-hand end plate;

FIG. 11 is a section through FIG. 6 on the line 11—11;

FIG. 12 is a section through FIG. 8 on the line 12—12;

FIG. 13 is a perspective view of the removable right-hand end plate;

FIG. 13a is a sectional view through FIG. 13 on the line 13a—13a;

FIG. 14 is a fragmentary sectional view through a portion of FIG. 10 on the line 14—14;

The operating mechanism of the present invention is inclosed in a case 18 having a removable cover 19 over the gears and code wheels hereinafter to be described. The plain language symbol keys 20 are variably connected to small electric lamps disposed under transparent elements 21 on each of which is a code symbol.

Figure 8:
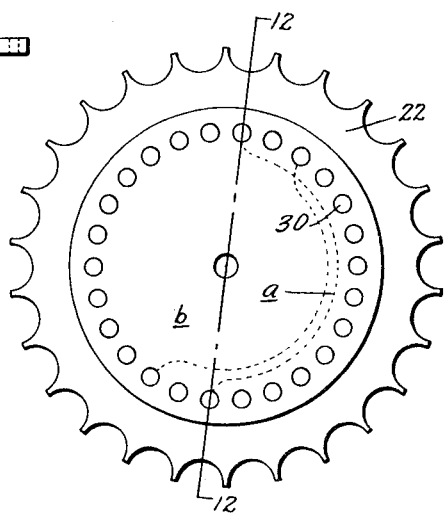
FIG. 8 is a side elevation of a code wheel having in it electric circuit elements whereof the two ends are randomly connected on opposite faces of the code wheel.
Figure 15:
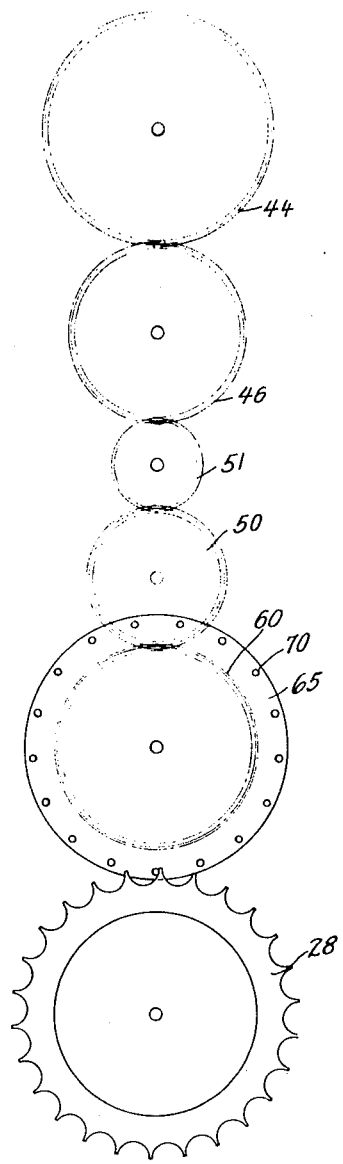
FIG. 15 is a schematic diagram of one gear train.

The plain language symbol keys are variably connectable to the code symbol lamps through randomly changing circuits provided by the mechanism now to be described. A plurality of code wheels 22 are coaxially mounted for independent rotation and between each two code wheels is an intermediate fixed member 23 secured to a standard 101 mounted on the base of the machine. At the left-hand end of the series of code wheels is a fixed plate 24 and a fixed member 25 and removable end plate 26 terminating the series of code wheels at the right-hand end. Each code wheel has a series of symbols 27, such as the alphabet, inscribed on its periphery and a circumferential series of teeth 28 corresponding to the symbols 27. As is shown in FIG. 12 a contact on the left-hand periphery of each code wheel such as 29 is connected to some one contact on the right-hand periphery other than the one directly opposite it, such as 30. In FIG. 8 the connection between contacts 29 and 30 is shown by the line a and that between another contact on the same side of the periphery as 29 and another contact on the same side as 30 is shown as line b. In FIG. 12 the wire a connects contacts 29 and 30. Although but two connections are shown in FIG. 12 and FIG. 8 it is to be understood that each contact on the left-hand side of the periphery is connected to some contact on the right-hand side of the periphery in some random manner, that is, there is no direct and regular sequence of connection between the two series of contacts. The only provision to be observed is that no contact in one of the code wheels 22 is connected to a contact on the opposite face thereof having the same relative position as the connections between any two contacts in another of the code wheels.

The intermediate fixed members 23 are likewise provided with an annular series of contacts 32 and 33 on each lateral face thereof. These contacts are urged outward by action of the spring 34 which likewise serves as an electrical connection between contacts 32 and 33. The left-hand end plate has on its inner face a series of contacts 36 having the same radial and angular spacing as does the series of contacts in the code wheels 22 and in the fixed members 23 whereby the several series of contacts will cooperate to form continuous electric circuits through the left-hand end plate, the code wheels, and the fixed members.

The right-hand end plate 25 also is provided with an annular series of contacts 37 which are connected to sockets 37b which are designed to receive the electrically conducting plug connections 38 on the removable end plate 26. As is shown in FIG. 13 each such contact 38 is electrically connected to some other contact, which for convenience may be designated 38', whereby a current of electricity passing into any one of them is carried by means of the said electric connection to some one other contact and thence through the right-hand end plate 25 coacting therewith and back through the series of code wheels 22 and fixed members 23 to the left-hand end plate 24 by a circuit different from that through which the current passed from left to right. While only one cross connection is shown on the removable end plate in FIG. 13, it is to be understood that each of the contacts is connected to some other contact.

A common shaft 98, suitably mounted at its ends, passes through the entire series of code wheels, fixed members, and right-hand end plates.

The code wheels are rotated by the mechanism now to be described. Operating handle 39 is pivoted upon the hub 40 of ratchet wheel 41 which has a number of teeth equal to the number of symbols on a code wheel; in the case of the English alphabet, this is twenty-six. The pawl 42 is pivoted upon the operating handle 39 to engage the teeth on rachet 41 and the slot 43 through which the operating handle 39 passes is of such length that it permits rotating the handle, and thereby rachet wheel 41, through 1/26th of a revolution. Fixed concentrically to the rachet wheel 41 is a driving gear 44 which meshes with driving pinion 45 secured on a shaft to which are also secured a series of pinions 46. The driving gear has, in the present machine, 130 teeth and it is therefore rotated through the angle subtended by 5 teeth each time the operating handle 39 is moved through the distance permitted by slot 43.

The number of teeth on the pinions 45 and 46 and on the idlers cooperating therewith is immaterial since they will be rotated through 5 teeth for each full movement of operating handle 39 regardless of the angle subtended thereby and it is the number of teeth through which they are rotated that is important in the present mechanism. The idlers mentioned are mounted in pairs in brackets 47 that are removably mounted in slots 48 in base member 49. The several pairs of idlers are respectively designated by 50 and 51, 52 and 53, 54 and 55, 56 and 57, and 58 and 59. The idlers 50, 52, 54, 56, and 58 are each meshed with a pinion 46 while the idlers 51, 53, 55, 57, and 59 are respectively meshed with gears 60, 61, 62, 63, and 64 that are respectively fixed concentrically to the control wheels 65, 66, 67, 68, and 69. Thus each gear fixed on a control wheel, the respective idlers coacting therewith, the respective pinion 40 that drives the idlers and the pinion 45 and gear 44 constitute a gear train to drive a respective code wheel.

Figure 1:
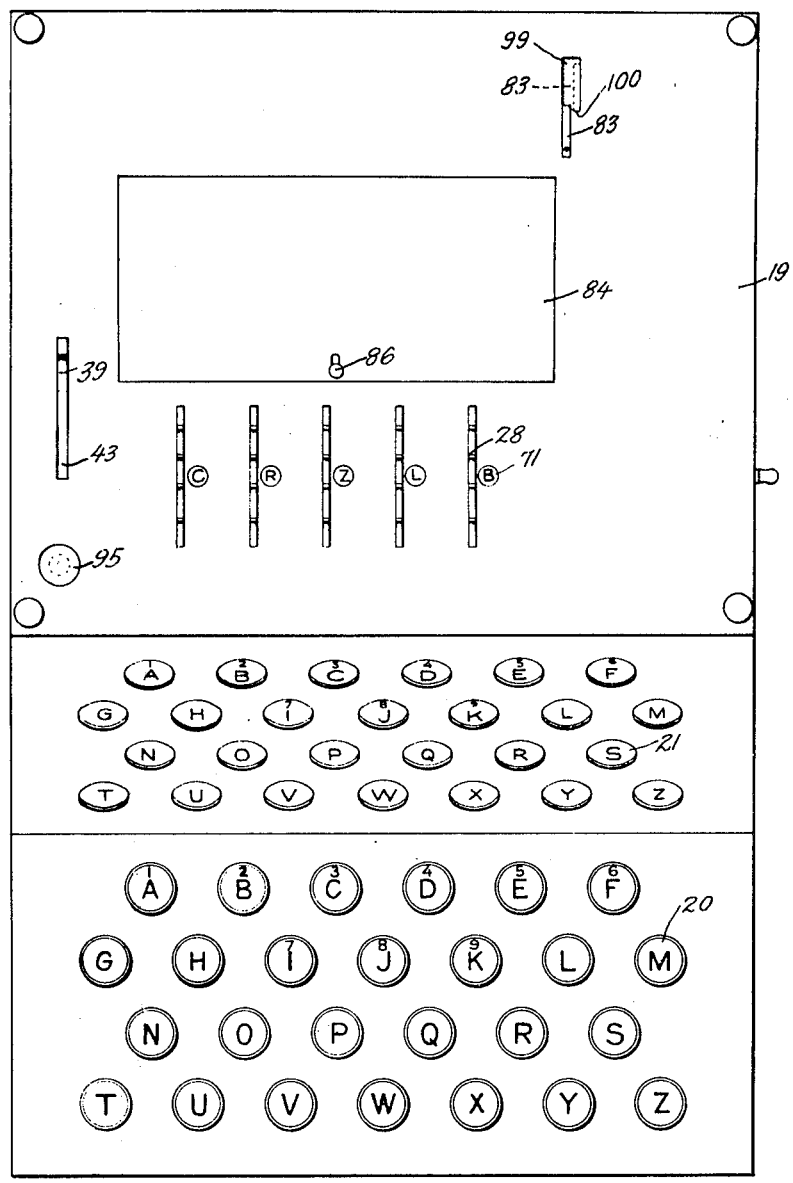
FIG. 1 is a top view of the assembled machine.
Figure 2:
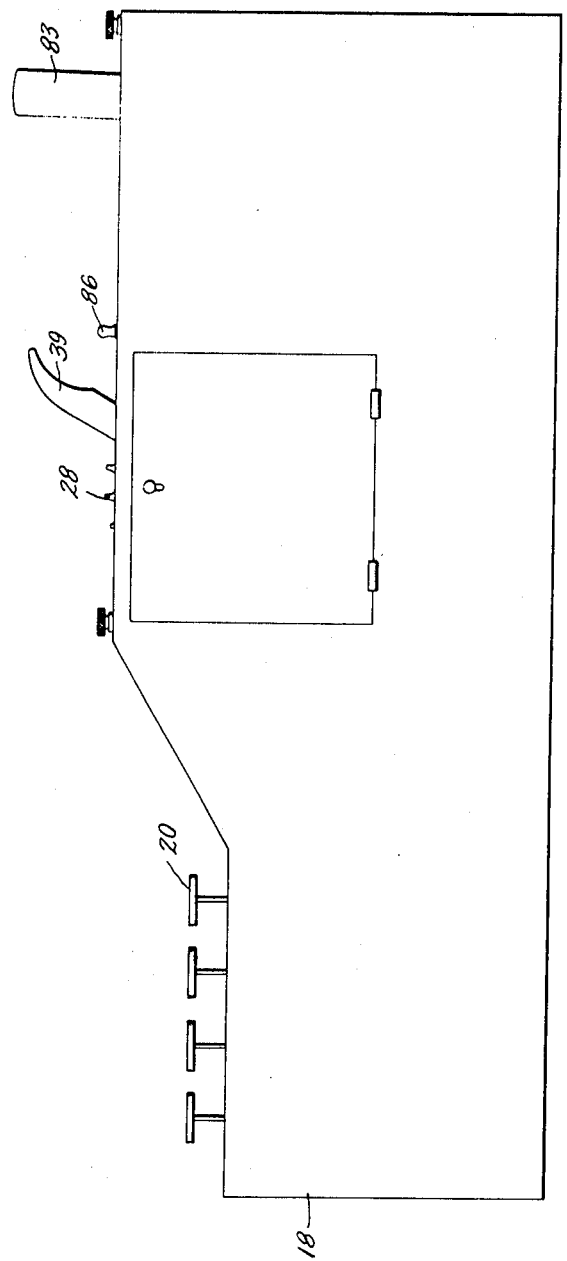
FIG. 2 is a side elevation thereof.
Figure 3:
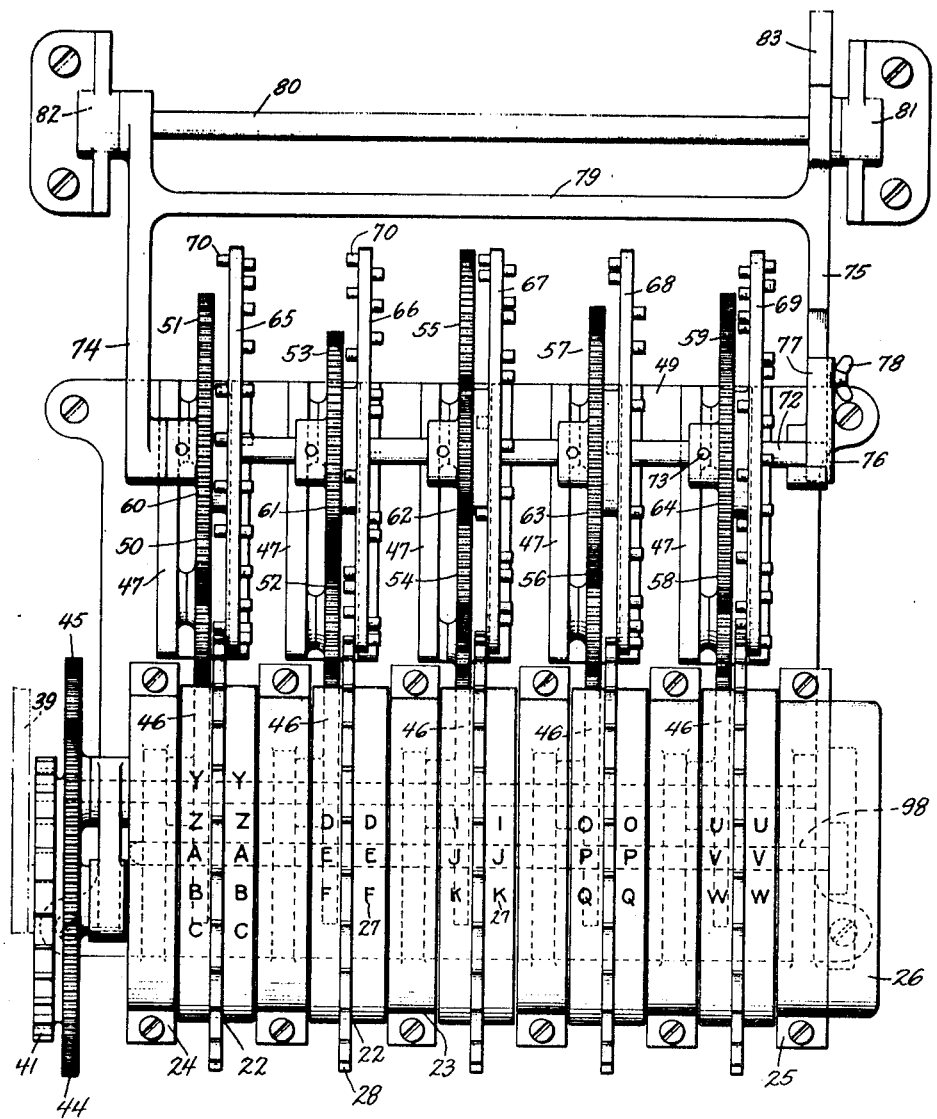
FIG. 3 is a top plan view of the principal operating parts in their assembled relation.
Figure 4:
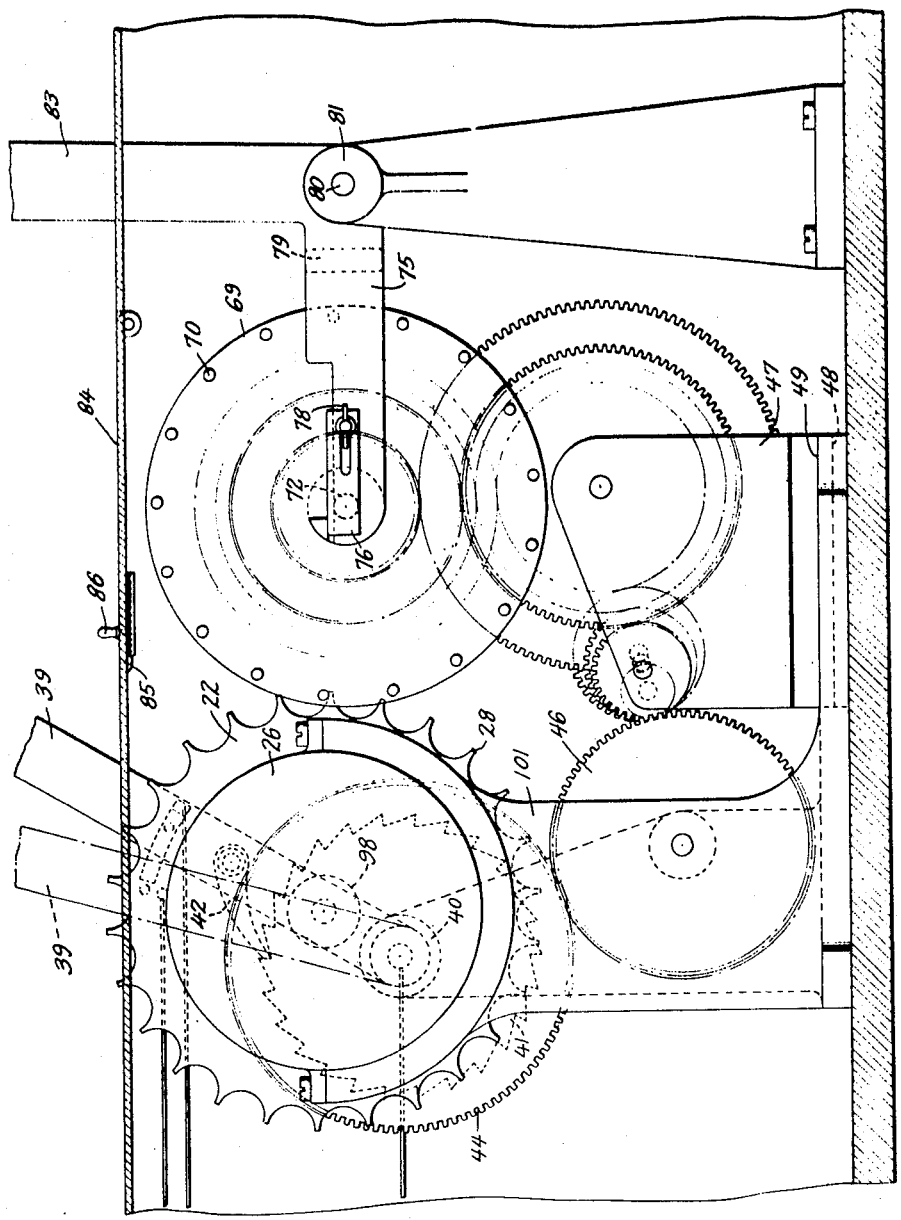
FIG. 4 is a side elevation of the parts shown in FIG. 3.
Figure 5:
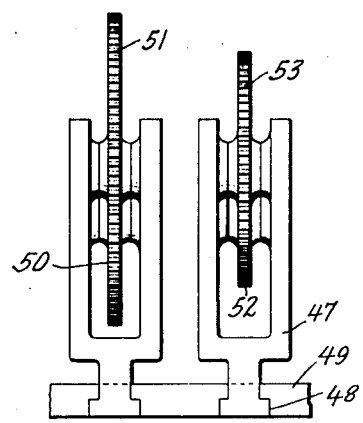
FIG. 5 is a detail view of the interchangeable idler gears.
Figure 6:
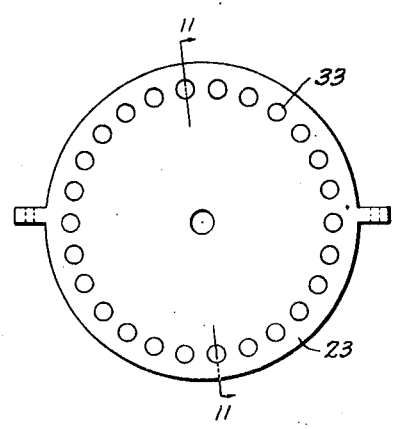
FIG. 6 is a side view of a fixed member having in it electric circuit elements whereof spring contacts on one side of the periphery are directly connected to similar spring contacts on the opposite side of the periphery.
Figure 7:
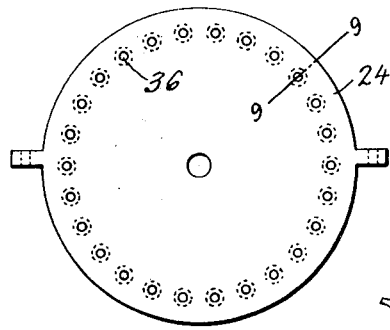
FIG. 7 is a side elevation of the left-hand end plate.
Figure 9:
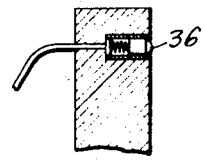
FIG. 9 is a fragmentary detail view of a portion of the left-hand end plate.

The several control wheels are provided with pins 70 that are slidable transversely in the control wheels so that any chosen one of said pins may be set to project on the left-hand face of the control wheel to engage the teeth 28 on a code wheel. It is preferable that the numbers of the pins in the several control wheels should have no common factor and convenient numbers that may be used therefor are 11, 17, 19, 23, and 25. In order that the control wheels which move the code wheels 22 respectively co-acting therewith through exactly the angular distance between two of the teeth 28 each time a pin 70 contacts one of said teeth, the number of teeth on each of the gears 60–64 should be equal to the number of pins 70 in the control wheel respectively connected thereto multiplied by 5, and the pins 70 in each control wheel should be spaced from each other by equal angles. It is apparent that these gear tooth values on the gears 60–64 will cause the control wheels connected thereto to revolve through the angular distance between two adjacent pins 70 for each full movement of the operating handle 39 and thus, if all the pins 70 are set to engage the teeth 28 on the code wheels, each code wheel will be rotated through the angular space between two of the symbols 27 by each movement of handle 39. However, the security of the code is increased by disposing certain ones of the pins 70 in positions so they will not engage the teeth 28 and therefore there will be no movement of the code wheel until a properly positioned pin is rotated into contact with a tooth 28 and the actuation of the code wheels may be given any desired intermittency. It will, of course, be understood that the person who is to decode a message must be informed of the setting of the pins 70 in the control wheels and the initial relative settings of the code and control wheels. For example, in FIG. 3 the left-hand code wheel is set with A uppermost, the second with E uppermost, the third with J uppermost, the fourth with P uppermost, and the fifth with V uppermost. The positions of the code wheels may be ascertained by looking through apertures 71 in cover 19 as is illustrated in FIG. 1 wherein the several code wheels are shown with the letters C, R, Z, L, and B, respectively, uppermost. Each pair of idlers must always drive the same control wheel, since their radii are such that they mesh properly with a pinion 46 and the gear on the respective control wheel but not with a control wheel gear of any other size. This is the reason for making the pairs of idlers removable.

The control wheels and the gears connected thereto are independently rotatable upon a shaft 72 and are prevented from moving longitudinally thereof by studs 73 extended into annular grooves cut in the shaft 72. The left-hand end of shaft 72 is inserted into a recess in arm 74 while the right-hand end thereof is seated in a semi-circular groove in arm 75. Latch 76 is longitudinally slidable on the arm 75 and has laterally overturned portion 77 that overlies the right-hand end of shaft 72 to retain it seated in the groove but when the wing nut 78 is loosened the latch 76 may be slid along arm 75 to leave shaft 72 free to be lifted from the groove and thus the shaft and all the control wheels may be removed as a unit for changing the relative positions of the code wheels thereon. The arms 74 and 75 are connected together by a transverse bar 79 and are rotatable on a shaft 80 whereof the ends are journaled in bearings 81 and 82. Lever 83 is fixed to arm 75 to rotate the control wheels as a unit to disengage the control wheels from the code wheels and the gears attached to the control wheels from mesh with the idlers to permit of changing the initial relative settings of the control and code wheels. The slot 99 in which lever 83 operates has an offset portion to form a shoulder 100 engageable by the lever to hold the control wheels in the non-operative position. A swingable closure 84 that is normally held closed by latch 85 operable by handle 86 may be opened to give access to the control wheels and to permit of their being swung upwardly by lever 83.

It is to be understood that all the contacts on the end plates 24 and 25, the removable end plate 26, the code wheels 22, and the fixed members 23 are disposed on co-axial circles and with equal angular spacings so that each contact is normally touching a contact in the member contiguous thereto and, therefore, there are twenty-six complete circuits from left to right always and twenty-six other complete circuits from right to left through the said elements, and consequently each symbol 20 is at all times connected with some one or another of the lamps that illuminate the code symbols 21.

In the ensuing discussion of the operation of my invention particular reference will be made to FIG. 16, wherein is shown diagrammatically the circuits. While three paths are indicated in some places and two paths in others, it is to be understood that the lines with arrows labelled a show the path of the current when encoding the letter A and the arrows designated x indicate the path of the current in decoding the letter X. It is assumed that in the case under consideration X is the code letter indicated when the key 20 having on it the letter A is depressed.

Figure 16:
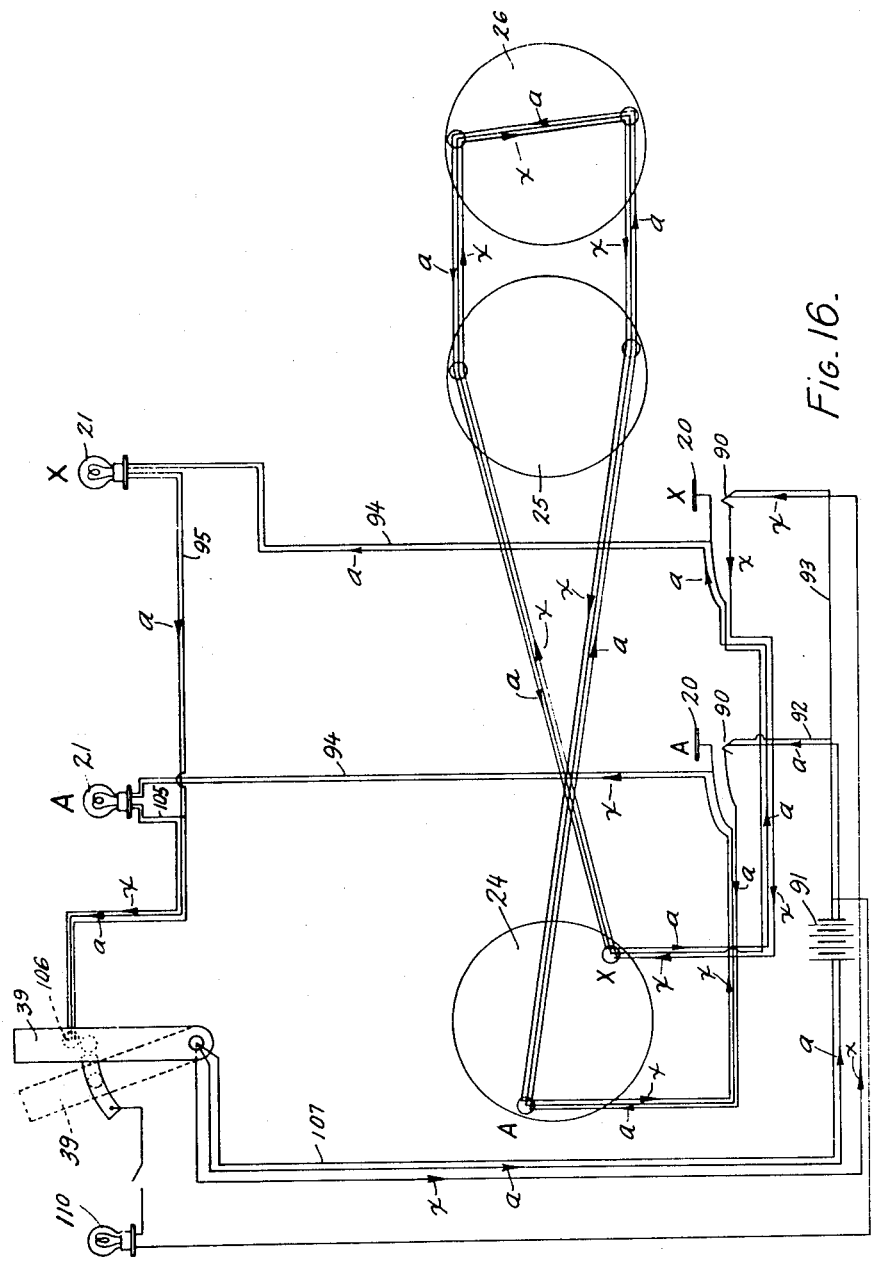
FIG. 16 is a diagrammatic representation of the circuits between a plain language symbol and a code symbol.

In FIG. 16 the keys 20, when depressed, close circuits through contacts 90 that are connected to a battery 91 by wires 92 and 93, though normally the keys are included in circuits to the code symbol lamps 21 by wires 94. From lamps 21 the current passes through wires 95 and 105 to contact 106, thence through operating handle 39 and wire 107 to battery 91.

When the letter A is to be encoded, the key 20 having that letter on it is depressed and current flows from battery 91 in the path indicated by arrows a to left-hand end plate 24, through the code wheels 22 and fixed members 23 to the right-hand end plate 25, thence into removable end plate 26 where it is turned back through the right-hand end plate 25, the code wheels 22, and fixed members 23 to the left-hand end plate 24, through the X key up to the X lamp 21 and back to the battery 91 through the part of the circuit above described. The letter X is recorded by hand. The operating handle 39 is then pulled forward to change the circuits through the machine, which also breaks the circuit at contact 106 so that no current can pass while the code wheels are being rotated. At the end of forward movement of handle 39 a circuit is closed through lamp 110 to indicate that the handle has been moved a sufficient distance to effect the change of circuits. The next letter in sequence is then encoded in the same manner.

Before decoding the letter X care must be taken that all of the code wheels and control wheels are in the same relative positions they occupied when the code letter X was written, including the same positions for the pins 70 in the control wheels. The X key 20 is then depressed, causing a flow of current as indicated by the arrows labelled x which causes the A lamp 21 to be lighted, and this letter is then recorded. The operating handle 39 is pulled forward to change the circuits and the next following letter is decoded.

I claim:

1. A coding and decoding machine, comprising a plurality of keys each of which bears a symbol, a plurality of indicating elements each of which represents a symbol on one of said keys, a plurality of co-axially mounted independently rotatable code wheels each of which has on its periphery a circumferential series of symbols corresponding to the symbols on said keys and a circumferential series of teeth each of which corresponds to one of said symbols on the wheel, a plurality of fixed members alternating with said code wheels including a fixed member at each end of the series of fixed members and code wheels, electrically conducting elements having relative positions corresponding to the symbols on the wheels extending transversely through said fixed members, conducting elements disposed in said code wheels and having the two ends of each connected at random in the series to co-act with the said elements in the fixed members to form permuting circuits between said keys and said indicating elements, a control wheel mounted adjacent each code wheel, said control wheels each having a plurality of adjustably positioned pins to engage the teeth on the respective code wheel, gear trains to drive said control wheels each at a speed different from the speeds of the others, and common driving means operatively connected to all of said gear trains.

2. A coding and decoding machine, comprising a plurality of keys each of which bears a symbol, a plurality of indicating elements each of which represents a symbol on one of said keys, a series of alternately disposed rotatable members and fixed members, wherein the first and last members are fixed, each of said rotatable members having on its periphery a circumferential series of symbols corresponding to the symbols on said keys and a series of teeth each of which corresponds in position to one of said symbols, electrically conducting elements extending transversely through said fixed members in positions corresponding to said symbols on said code wheels, conducting elements in said code wheels likewise extending through said code wheels to co-act with the conducting elements in said fixed members to form permuting circuits through said series, means co-acting with said last member of the series to connect together two circuits through said series to return from the last member to the first member a current sent from said first member to the last member, means electrically connecting each key to said first member and each indicating element to a different portion thereof, means engaging the teeth on said rotatable members to drive each of said rotatable members intermittently at predetermined intervals, a gear train of different ratio connected to drive each of said engaging means, common driving means for all of said gear trains, means to disengage said engaging means from the gear trains and from the rotatable means, and means to actuate said driving means through a degree of motion corresponding to a movement of a rotatable member through the angular distance between two adjacent symbols on such rotatable member.

3. A coding and decoding machine, comprising a plurality of keys each of which bears a symbol, a plurality of indicating elements each of which represents a symbol on one of said keys, and means to connect each of said keys at random to an indicating element, said means including devices for forming randomly permuting electric circuits between said keys and said indicating elements, operating mechanisms acting at respectively different rates upon different ones of said devices to change said circuits, common driving means for all of said mechanisms, and means for simultaneously disconnecting all of said devices from said devices to permit of setting said devices to desired relative initial positions.

4. A coding and decoding machine, comprising a plurality of keys each of which bears a symbol, a plurality of indicating elements each of which represents a symbol on one of said keys, means to connect each of said keys at random to an indicating element, said means including devices for forming randomly permuting electric circuits between said keys and said indicating elements, a plurality of rotatable members each positioned to co-act respectively with one of said devices, selectively adjustable elements carried by said rotatable members to have intermittent driving engagement with the respectively co-acting devices, gear trains of different ratios to drive said rotatable members, common driving means for all of said gear trains, means to move all of said rotatable members out of cooperating engagement with gear trains and said rotatable elements, and means to actuate said common driving means through a predetermined degree of movement.

5. A coding and decoding machine, comprising a plurality of keys each of which bears a symbol, a plurality of indicating elements each of which represents a symbol on one of said keys, means to connect each of said keys at random to an indicating element, said means including devices for forming randomly permuting electric circuits between said keys and said indicating elements, a plurality of rotatable members each positioned to co-act respectively with one of said devices, selectively adjustable elements carried by said rotatable members to have intermittent driving engagement with the respectively co-acting devices, gear trains of different ratios to drive said rotatable members, common driving means for all of said gear trains, means to move all of said rotatable members out of cooperating engagement with gear trains and said rotatable elements, means to actuate said common driving means through a predetermined degree of movement, and an indicator controlled by said last mentioned means to show when said degree of movement has been executed.

6. A coding and decoding machine, comprising a plurality of keys each of which bears a symbol, a plurality of indicating elements each of which represents a symbol on one of said keys, a plurality of code wheels each having on its periphery a circumferential series of symbols and a series of teeth corresponding in number to said symbols, fixed members co-acting with said wheels, electrically conducting elements in each of said wheels and in each of said members equal in number to said symbols cooperating to form randomly permuting circuits between said keys and said indicating elements, control wheels equal in number to said code wheels mounted to cooperate each with a respective code wheel, pins slidably mounted in said control wheels movable to positions to engage the teeth on the respective code wheels or out of such engaging positions, the number of such pins in each control wheel having no factor common to the number in any other control wheel, a driving gear, means to rotate said driving gear a fraction of a revolution that is represented by the reciprocal of the number of said symbols, and means connecting said driving gear to each control wheel to rotate each control wheel through a fraction of a revolution that is represented by the reciprocal of the number of pins in such wheel each time said gear is rotated through the said fraction of a revolution thereof.

7. A coding and decoding machine, comprising a plurality of keys each of which bears a symbol, a plurality of indicating elements each of which represents a symbol on one of said keys, a plurality of code wheels each having on its periphery a circumferential series of symbols and a series of teeth corresponding in number to said symbols, fixed members co-acting with said wheels, electrically conducting elements in each of said wheels and in each of said members equal in number to said symbols cooperating to form randomly permuting circuits between said keys and said indicating elements, control wheels equal in number to said code wheels mounted to cooperate each with a respective code wheel, projecting elements on each control wheel to engage the teeth on the cooperating code wheel, the number of such projections on each control wheel having no factor in common with the number thereof on any other control wheel, a driving gear, means to rotate said gear through a part of a revolution that is integrally divisible by the fraction represented by the reciprocal of the number of said symbols, and means connecting said driving gear to each control wheel to rotate each control wheel through a part of a revolution that is integrally divisible by the fraction represented by the reciprocal of the number of said projecting elements on each wheel, each time said gear is rotated through the said part of a revolution thereof.

8. A coding and decoding machine, comprising a plurality of keys each of which bears a symbol, a plurality of indicating elements each of which represents a symbol on one of said keys, a plurality of code wheels each having on its periphery a circumferential series of symbols and a series of teeth corresponding in number to said symbols, fixed members co-acting with said wheels, electrically conducting elements in each of said wheels and in each of said members equal in number to said symbols cooperating to form randomly permuting circuits between said keys and said indicating elements, control wheels equal in number to said code wheels mounted to cooperate each with a respective code wheel, projecting elements on each control wheel to engage the teeth on the cooperating code wheel, the number of such projections on each control wheel having no factor in common with the number thereof on any other control wheel, a driving gear, means to rotate said gear through a part of a revolution that is integrally divisible by the fraction represented by the reciprocal of the number of said symbols, means connecting said driving gear to each control wheel to rotate each control wheel through a part of a revolution that is integrally divisible by the fraction represented by the reciprocal of the number of said projecting elements on each wheel, each time said gear is rotated through the said part of a revolution thereof, and means to move said control wheels simultaneously out of operative relation with the said connecting means and said code wheels.

9. A coding and decoding machine, comprising a plurality of keys each of which bears a symbol, a plurality of indicating elements each of which represents a symbol on one of said keys, a plurality of code wheels each having on its periphery a circumferential series of symbols and a series of teeth corresponding in number to said symbols, fixed members co-acting with said wheels, electrically conducting elements in each of said wheels and in each of said members equal in number to said symbols connected in haphazard sequence to form randomly permuting circuits between said keys and said indicating elements, and means for actuating said code wheels including elements respectively having variably intermittent engagement with the teeth on said code wheels.

10. A coding and decoding machine, comprising a plurality of keys each of which bears a symbol, a plurality of indicating elements each of which represents a symbol on one of said keys, a plurality of groups of cooperating electric circuit elements, the number of elements in each group being the same as the number of said symbols, certain of said groups being movable with respect to the cooperating groups immediately contiguous thereto to form randomly permuting circuits connecting said keys to said indicating elements, a driving gear rotatable by steps each of which equals that fraction of a revolution represented by the reciprocal of the number of said symbols, and means connecting said gear to move said movable groups including rotatable elements each of which is moved through a fraction of a revolution each time said gear is moved through said fraction of a revolution of said gear, the fractions representing the part of a revolution executed by the several rotatable elements having no common factor in their denominators.

* * * * *